United States Patent
Porto Arantes et al.

(10) Patent No.: US 11,049,172 B2
(45) Date of Patent: *Jun. 29, 2021

(54) METHOD, APPARATUS, AND COMPUTER READABLE MEDIUM FOR GROUP GIFTING IN A RANDOMIZED FORMAT

(71) Applicant: Groupon, Inc., Chicago, IL (US)

(72) Inventors: Natalia Moreira Porto Arantes, Sao Paulo (BR); Victor de Freitas Valle Galante, Sao Paulo (BR); Scott Rogers, Mountain View, CA (US); Mark Christopher Webster, New York, NY (US); Fabio Fernandes Mignoto, Sao Paulo (BR); Gabriel Matsuo Molinari Sakai, Sao Paulo (BR)

(73) Assignee: GROUPON, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,025

(22) Filed: Apr. 14, 2020

(65) Prior Publication Data

US 2020/0242681 A1    Jul. 30, 2020

Related U.S. Application Data

(63) Continuation of application No. 14/629,788, filed on Feb. 24, 2015, now Pat. No. 10,650,436.
(Continued)

(51) Int. Cl.
G06Q 30/02     (2012.01)
G06Q 30/06     (2012.01)
G06Q 50/00     (2012.01)

(52) U.S. Cl.
CPC ..... G06Q 30/0635 (2013.01); G06Q 30/0214 (2013.01); G06Q 30/0215 (2013.01);
(Continued)

(58) Field of Classification Search
None
See application file for complete search history.

(56) References Cited

U.S. PATENT DOCUMENTS 7,222,087 B1 *  5/2007  Bezos ............... G06Q 30/0641
                                                        705/26.81
8,548,865 B1    10/2013 Ho
(Continued)

OTHER PUBLICATIONS

Online Group Gift, An ip.com Prior Art Database Technical Disclosure; Oct. 16, 2008; IPCOM000175623D.*
(Continued)

*Primary Examiner* — David J Stoltenberg
(74) *Attorney, Agent, or Firm* — Alston & Bird LLP

(57) ABSTRACT

Provided herein are systems, methods and computer readable media for proving gift giving within a group. Consumers may register for a gift giving program, create a group and invite other consumers to participate. Group members may be randomly assigned to a group, or assigned to a group based on an invitation or indicated group. Relationships between gift givers and recipients within a group may be determined, such as in a randomized format. Gift givers may purchase a gift, such as a good or a promotion from a promotion and marketing service. The promotion and marketing service may assign the promotion to the recipient so that the recipient may redeem the promotion for a good, service, or experience. Promotions may be automatically purchased on behalf of a gift giver who fails to purchase the promotion by a gift-giving deadline.

18 Claims, 10 Drawing Sheets

Related U.S. Application Data

(60) Provisional application No. 61/944,262, filed on Feb. 25, 2014.

(52) U.S. Cl.
CPC ..... *G06Q 30/0222* (2013.01); *G06Q 30/0631* (2013.01); *G06Q 50/01* (2013.01)

(56) References Cited

U.S. PATENT DOCUMENTS

| | | | |
|---|---|---|---|
| 8,768,838 B1* | 7/2014 | Hoffman | G06Q 40/00 705/44 |
| 9,152,992 B1* | 10/2015 | Vippagunta | G06Q 30/0631 |
| 10,650,436 B1* | 5/2020 | Porto Arantes | G06Q 30/0214 |
| 2002/0103753 A1 | 8/2002 | Schimmel | |
| 2004/0148228 A1 | 7/2004 | Kwei | |
| 2005/0033650 A1 | 2/2005 | Robertson | |
| 2005/0197919 A1 | 9/2005 | Robertson | |
| 2006/0161484 A1* | 7/2006 | Pandhe | G06Q 30/06 705/26.81 |
| 2009/0222352 A1* | 9/2009 | Shaer | G06Q 30/0273 705/26.1 |
| 2009/0259562 A1* | 10/2009 | Choi | G06Q 30/0641 705/26.1 |
| 2009/0327129 A1 | 12/2009 | Collas et al. | |
| 2010/0115419 A1 | 5/2010 | Mizuno | |
| 2010/0185532 A1* | 7/2010 | Allocca | G06Q 30/0641 705/26.1 |
| 2010/0250372 A1* | 9/2010 | Smith | G06Q 20/045 705/14.68 |
| 2010/0280879 A1* | 11/2010 | O'Sullivan | G06Q 30/0217 705/14.19 |
| 2011/0010277 A1 | 1/2011 | Enzaldo | |
| 2011/0137749 A1 | 6/2011 | Kwei | |
| 2011/0231269 A1* | 9/2011 | Mulhall | G06Q 40/02 705/17 |
| 2012/0150599 A1 | 6/2012 | Isaacson et al. | |
| 2012/0150600 A1 | 6/2012 | Isaacson et al. | |
| 2012/0150611 A1 | 6/2012 | Isaacson et al. | |
| 2012/0150643 A1 | 6/2012 | Wolfe et al. | |
| 2012/0150729 A1 | 6/2012 | Isaacson et al. | |
| 2012/0150730 A1 | 6/2012 | Isaacson et al. | |
| 2012/0150731 A1 | 6/2012 | Isaacson et al. | |
| 2012/0150732 A1 | 6/2012 | Isaacson et al. | |
| 2012/0150740 A1 | 6/2012 | Isaacson et al. | |
| 2012/0150743 A1 | 6/2012 | Isaacson et al. | |
| 2013/0036025 A1 | 2/2013 | Pottier et al. | |
| 2013/0117151 A1* | 5/2013 | Macaisa | G06Q 30/0633 705/26.8 |
| 2013/0144707 A1 | 6/2013 | Isaacson et al. | |
| 2013/0212610 A1 | 8/2013 | Hussain et al. | |
| 2013/0218646 A1 | 8/2013 | Fargo et al. | |
| 2013/0227384 A1 | 8/2013 | Good et al. | |
| 2013/0268440 A1* | 10/2013 | Tierney | G06Q 20/342 705/44 |
| 2013/0290172 A1 | 10/2013 | Mashinsky | |
| 2013/0304576 A1* | 11/2013 | Berland | G06Q 50/01 705/14.53 |
| 2013/0325723 A1 | 12/2013 | Hussein et al. | |
| 2013/0332307 A1 | 12/2013 | Linden et al. | |
| 2013/0332308 A1 | 12/2013 | Linden et al. | |
| 2013/0339117 A1* | 12/2013 | Chapman | G06Q 30/02 705/14.23 |
| 2014/0046865 A1* | 2/2014 | Tierney | G06Q 30/0279 705/329 |
| 2014/0046937 A1 | 2/2014 | Chennavasin | |
| 2014/0108177 A1* | 4/2014 | Erke | G06Q 30/0601 705/26.1 |
| 2014/0114965 A1 | 4/2014 | Balduzzi et al. | |
| 2014/0229321 A1 | 8/2014 | Ranganath et al. | |
| 2014/0229322 A1 | 8/2014 | Ranganath et al. | |
| 2014/0229552 A1 | 8/2014 | Ranganath et al. | |
| 2014/0250002 A1* | 9/2014 | Isaacson | G06Q 30/0224 705/39 |
| 2014/0257945 A1 | 9/2014 | Sandridge et al. | |
| 2014/0316935 A1 | 10/2014 | Robertson | |
| 2014/0330713 A1* | 11/2014 | Isaacson | G06Q 20/387 705/41 |
| 2014/0351130 A1 | 11/2014 | Cheek et al. | |
| 2015/0106179 A1 | 4/2015 | Chow et al. | |
| 2015/0205802 A1 | 7/2015 | Levinsky et al. | |
| 2016/0117651 A1 | 4/2016 | Davis | |
| 2020/0242681 A1* | 7/2020 | Porto Arantes | G06Q 30/0631 |

OTHER PUBLICATIONS

Social Identity and Reciprocity in Online Gift Giving Networks; Teubner et al., 2013 46th Hawaii International Conference on System Sciences.*
U.S. Appl. No. 14/629,788, filed Feb. 24, 2015, U.S. Pat. No. 10,650,436, Issued.
U.S. Appl. No. 13/411,502, filed Mar. 2, 2012, In re: O'Brien et al. entitled Relevance System for Consumer Deals.

* cited by examiner

METHOD, APPARATUS, AND COMPUTER READABLE MEDIUM FOR GROUP GIFTING IN A RANDOMIZED FORMAT

CROSS REFERENCES TO RELATED APPLICATIONS

This application is a continuation of and claims priority to U.S. application Ser. No. 14/629,788, filed Feb. 24, 2015, and titled, "Method, Apparatus, And Computer Readable Medium For Group Gifting In A Randomized Format," which is hereby incorporated by reference in its entirety.

This application further claims the benefit of priority to U.S. Provisional Application No. 61/944,262, filed Feb. 25, 2014 and titled, "Method, Apparatus, And Computer Readable Medium For Group Gifting In A Randomized Format," which is hereby incorporated by reference in its entirety.

The present application is also related to: 1) U.S. patent application Ser. No. 13/786,828, filed Mar. 6, 2013, titled "Method, Apparatus, And Computer Readable Medium For Transferring Of Promotions," 2) U.S. patent application Ser. No. 13/411,502, filed Mar. 2, 2012, titled "Relevance System For Consumer Deals," and 3) U.S. patent application Ser. No. 13/800,536, filed Mar. 13, 2013, titled "Method, Apparatus, And Computer Program Product For Ranking Content Channels," each of which are hereby incorporated by reference in their entireties.

FIELD

Embodiments of the invention relate, generally, to providing promotions and, more particularly, to gifting promotions or other gifts in a group, such as via a randomized group format.

BACKGROUND

Various embodiments of the invention are related to promotional systems, and particularly to a method and apparatus for providing management of sales proposals. Applicant has discovered problems with and related opportunities relating to the sales of promotions and group gifting (e.g., group gift exchanges). Through applied effort, ingenuity, and innovation, Applicant has solved many of these identified problems by developing a solution that is embodied by the present invention, which is described in detail below.

BRIEF SUMMARY

A method for facilitating group gift giving by a promotion and marketing service is provided, the method comprising receiving, via a network interface, a request associated with a first user account to participate in a gift giving program, in response to receiving the request, and with group management circuitry of a promotion and marketing service, determining a gift giving group to which to assign the first user account, assigning the first user account to the gift giving group, determining a relationship between the first user account and a second user account, wherein the second user account is assigned to the gift giving group and the relationship identifies the first user account as a giver and the second user account as a recipient, generating a graphical user interface comprising status information regarding the gift giving group, the status information comprising an indication of whether at least one member of the gift giving group has purchased a gift for at least one other member of the gift giving group and an e-commerce interface for purchasing a gift, providing the graphical user interface via a web site, receiving a gift purchase trigger via the graphical user interface, the gift purchase trigger associated with the relationship between the first user account and the second user account, and in response to receiving the gift purchase trigger, causing a purchase of a gift on behalf of the first user account for the second user account.

In some examples, the gift comprises at least a promotion indicative of a promotional value toward a purchase of any of a good or service. In some examples, the method includes, in response to the request, causing display of a prompt for payment information, receiving payment information associated with the first user account, and verifying the received payment information, wherein the assigning the first user account to the gift giving group is dependent on the verification of the received payment information.

In some examples, the method includes determining a maximum cost of gifts for the gift giving group, and causing display of gift recommendations based on the maximum cost and as determined by relevancy circuitry of the promotion and marketing service.

In some examples, the method includes receiving a plurality of requests to participate in the gift giving program, each request associated with a unique user account, assigning each of the unique user accounts to the gift giving group, and identifying a plurality of relationships such that each of the unique user accounts is identified as a giver in at least one of the plurality of relationships and a recipient in at least a second relationship of the plurality of relationships.

The method further includes providing a plurality of recommended gifts for the recipient based on a relevancy score of each of the plurality of the recommended gifts calculated by relevancy circuitry of the promotion and marketing service, and generating the purchase trigger in response to receiving an indication of a selection by the gift giver of at least one of the plurality of recommended gifts, wherein the selection indicates the intent of the gift giver to purchase the selected at least one of the plurality of recommended gift for the recipient.

The method may include generating the gift purchase trigger in response to determining, following expiration of a gift-giving deadline, that the gift giver has not purchased a gift for the recipient, and automatically purchasing the gift on behalf of the first user account using stored electronic payment information associated with the first user account.

In some examples, the gift is automatically identified based on a relevancy score for the second user account calculated by relevancy circuitry of the promotion and marketing service. In some examples, determining the gift giving group to which to assign the first user account comprises determining the gift giving group at random, and wherein the determining a relationship between the first user account and a second user account comprises determining the relationship at random.

In some embodiments, the method includes receiving an invitation request to send an invitation to an additional user, in response to the invitation request, generating a notification including information regarding the gift giving group, and causing transmission of the notification to the additional user.

In some examples, the gift is recommended by relevancy circuitry of the promotion and marketing service based on at least one a recipient location, recipient interests, or past recipient purchases.

An apparatus is provided for facilitating group gift giving by a promotion and marketing service, the apparatus comprising at least processing circuitry and a network interface configured to receive a request initiated by a consumer device and associated with a first user account to participate in a gift giving program, and group management circuitry configured by at least the processing circuitry to, in response to receiving the request, determine a gift giving group to which to assign the first user account, assign the first user account to the gift giving group, determine a relationship between the first user account and a second user account, wherein the second user account is assigned to the gift giving group and the relationship identifies the first user account as a giver and the second user account as a recipient, wherein the processing circuitry is configured to generate a graphical user interface comprising status information regarding the gift giving group, the status information comprising an indication of whether at least one member of the gift giving group has purchased a gift for at least one other member of the gift giving group, wherein the processing circuitry is further configured to receive a gift purchase trigger via the graphical user interface, the gift purchase trigger associated with the relationship between the first user account and the second user account, and wherein the processing circuitry is further configured to, in response to receiving the gift purchase trigger, cause a purchase of a gift on behalf of the first user account for the second user account, with an e-commerce interface.

In some examples, the gift comprises at least a promotion indicative of a promotional value toward a purchase of any of a good or service. In some examples, the processing circuitry is further configured to cause the apparatus to at least in response to the request, cause display of a prompt for payment information, receive payment information associated with the first user account, and verify the received payment information, wherein the assigning the first user account to the gift giving group is dependent on the verification of the received payment information.

In some examples, the processing circuitry is further configured to cause the apparatus to at least determine a maximum cost of gifts for the gift giving group, and cause display of gift recommendations based on the maximum cost and as determined by relevancy circuitry of the promotion and marketing service.

In some examples, the processing circuitry is further configured to cause the apparatus to at least receive a plurality of requests to participate in the gift giving program, each request associated with a unique user account, assign each of the unique user accounts to the gift giving group, and identify a plurality of relationships such that each of the unique user accounts is identified as a giver in at least one of the plurality of relationships and a recipient in at least a second relationship of the plurality of relationships.

In some embodiments, the processing circuitry is further configured to cause the apparatus to at least provide a plurality of recommended gifts for the recipient based on a relevancy score of each of the plurality of the recommended gifts calculated by relevancy circuitry of the promotion and marketing service, and generate the purchase trigger in response to receiving an indication of a selection by the gift giver of at least one of the plurality of recommended gifts, wherein the selection indicates the intent of the gift giver to purchase the selected at least one of the plurality of recommended gift for the recipient.

In some embodiments, the processing circuitry is further configured to cause the apparatus to at least generate the gift purchase trigger in response to determining, following expiration of a gift-giving deadline, that the gift giver has not purchased a gift for the recipient, and automatically purchase the gift on behalf of the first user account using stored electronic payment information associated with the first user account.

In some examples, the gift is automatically identified based on a relevancy score for the second user account calculated by relevancy circuitry of the promotion and marketing service.

A computer program product is provided for facilitating group gift giving by a promotion and marketing service, the computer program product comprising at least one non-transitory computer-readable medium having computer-readable program instructions stored therein, the computer-readable program instructions comprising instructions, which when performed by an apparatus, are configured to cause the apparatus to at least with a network interface, receive a request associated with a first user account to participate in a gift giving program, with group management circuitry, in response to receiving the request, determine a gift giving group to which to assign the first user account, assign the first user account to the gift giving group, determine a relationship between the first user account and a second user account, wherein the second user account is assigned to the gift giving group and the relationship identifies the first user account as a giver and the second user account as a recipient, generate a graphical user interface comprising status information regarding the gift giving group, the status information comprising an indication of whether at least one member of the gift giving group has purchased a gift for at least one other member of the gift giving group and an e-commerce interface for purchasing a gift, receive a gift purchase trigger via the graphical user interface, the gift purchase trigger associated with the relationship between the first user account and the second user account, and in response to receiving the gift purchase trigger, cause a purchase of a gift on behalf of the first user account for the second user account.

In general, embodiments of the present invention provided herein include systems, methods and computer readable media for gifting goods and/or promotions in a randomized group format.

A method is provided, the method including receiving a request associated with a first user account to participate in a gift giving program, in response to the request, and with a processor, determining a gift giving group to which to assign the first user account, assigning the first user account to the gift giving group, determining a relationship between the first user account and a second user account, wherein the second user account is assigned to the gift giving group and the relationship identifies the first user account as a giver and the second user account as a recipient, receiving a gift purchase trigger associated with the relationship between the first user account and the second user account, and in response to receiving the gift purchase trigger, causing a purchase of a gift on behalf of the first user account for the second user account.

In some embodiments, the gift comprises at least one of a good or a promotion.

In some embodiments, the method further includes, in response to the request, causing display of a prompt for payment information, receiving payment information associated with the first user account, and verifying the received payment information, wherein the assigning the first user account to the gift giving group is dependent on the verification of the received payment information.

In some embodiments, the method further includes determining a maximum cost of gifts for the gift giving group, and causing display of gift recommendations based on the maximum cost.

The method may include receiving a plurality of requests to participate in the gift giving program, each request associated with a unique user account, assigning each of the unique user accounts to the gift giving group, and identifying a plurality of relationships such that each of the unique user accounts is identified as a giver in at least one of the plurality of relationships and a recipient in at least a second relationship of the plurality of relationships.

The method may further include providing a plurality of recommended gifts for the recipient based on a relevancy score of each of the plurality of the recommended gifts, and generating the purchase trigger in response to receiving an indication of a selection by the gift giver of at least one of the plurality of recommended gifts, wherein the selection indicates the intent of the gift giver to purchase the selected at least one of the plurality of recommended gift for the recipient.

In some embodiments, the method includes generating the gift purchase trigger in response to determining, following expiration of a gift-giving deadline, that the gift giver has not purchased a gift for the recipient, and automatically purchasing the gift on behalf of the first user account.

In some embodiments, the gift is automatically identified based on a relevancy score for the second user account.

In some embodiments, determining the gift giving group to which to assign the first user account comprises determining the gift giving group at random, and wherein the determining a relationship between the first user account and a second user account comprises determining the relationship at random.

In some embodiments, the method includes receiving an invitation request to send an invitation to an additional user, in response to the invitation request, generating a notification including information regarding the gift giving group, and causing transmission of the notification to the additional user. In some embodiments, the gift is recommended based on at least one a recipient location, recipient interests, or past recipient purchases.

An apparatus is provided, including processing circuitry configured to cause the apparatus to at least receive a request associated with a first user account to participate in a gift giving program, in response to the request, and with a processor, determine a gift giving group to which to assign the first user account, assign the first user account to the gift giving group, determine a relationship between the first user account and a second user account, wherein the second user account is assigned to the gift giving group and the relationship identifies the first user account as a giver and the second user account as a recipient, receive a gift purchase trigger associated with the relationship between the first user account and the second user account, and in response to receiving the gift purchase trigger, cause a purchase of a gift on behalf of the first user account for the second user account.

A computer program product is provided, including at least one non-transitory computer-readable medium having computer-readable program instructions stored therein, the computer-readable program instructions comprising instructions, which when performed by an apparatus, are configured to cause the apparatus to at least receive a request associated with a first user account to participate in a gift giving program, in response to the request, and with a processor, determine a gift giving group to which to assign the first user account, assign the first user account to the gift giving group, determine a relationship between the first user account and a second user account, wherein the second user account is assigned to the gift giving group and the relationship identifies the first user account as a giver and the second user account as a recipient, receive a gift purchase trigger associated with the relationship between the first user account and the second user account, and in response to receiving the gift purchase trigger, cause a purchase of a gift on behalf of the first user account for the second user account.

An apparatus is provided, with means for receiving a request associated with a first user account to participate in a gift giving program, in response to the request, and with a processor, means for determining a gift giving group to which to assign the first user account, assigning the first user account to the gift giving group, means for determining a relationship between the first user account and a second user account, wherein the second user account is assigned to the gift giving group and the relationship identifies the first user account as a giver and the second user account as a recipient, means for receiving a gift purchase trigger associated with the relationship between the first user account and the second user account, and in response to receiving the gift purchase trigger, means for causing a purchase of a gift on behalf of the first user account for the second user account.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE SEVERAL VIEWS OF THE DRAWINGS

Figure 1:
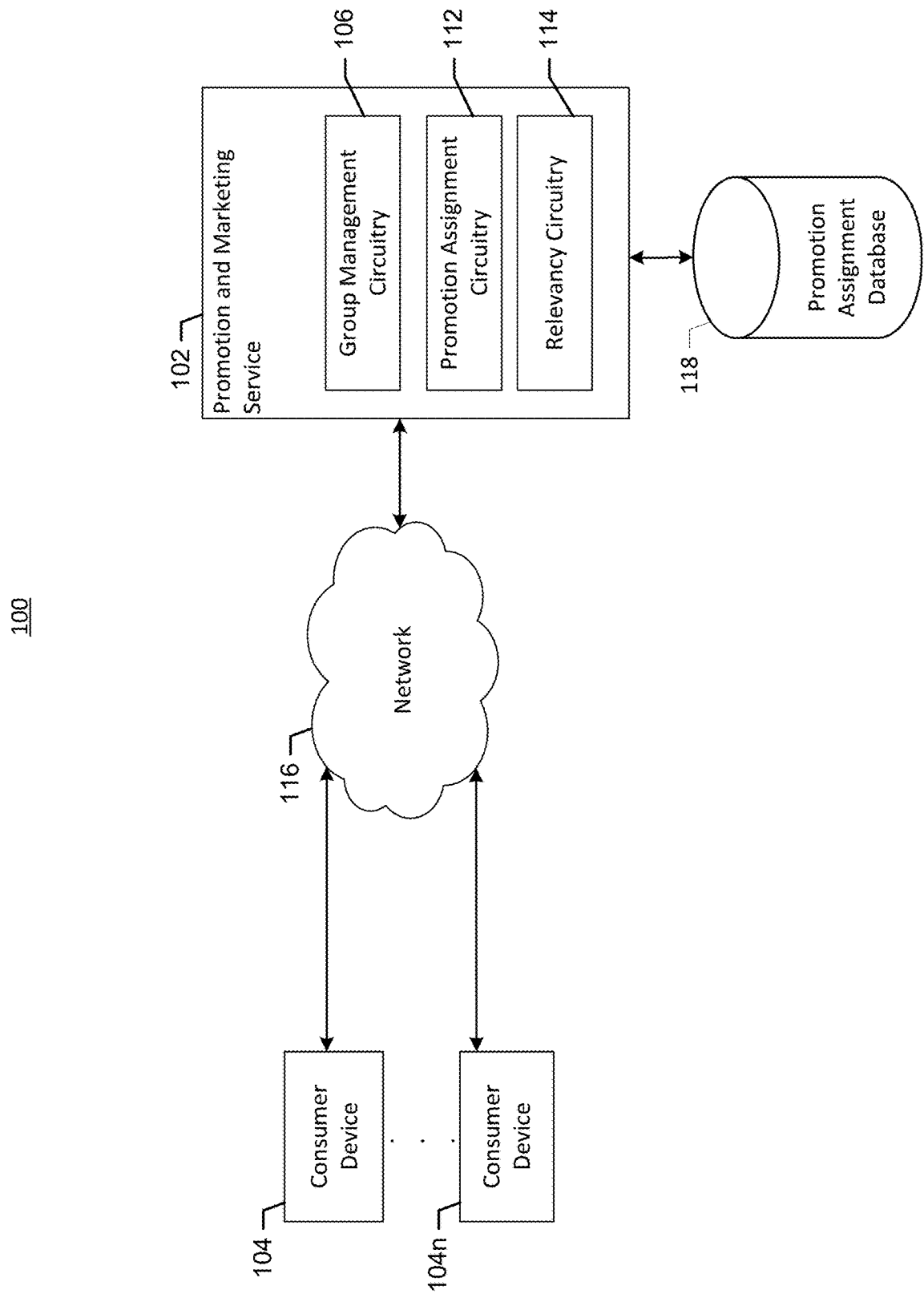
Figure 2:
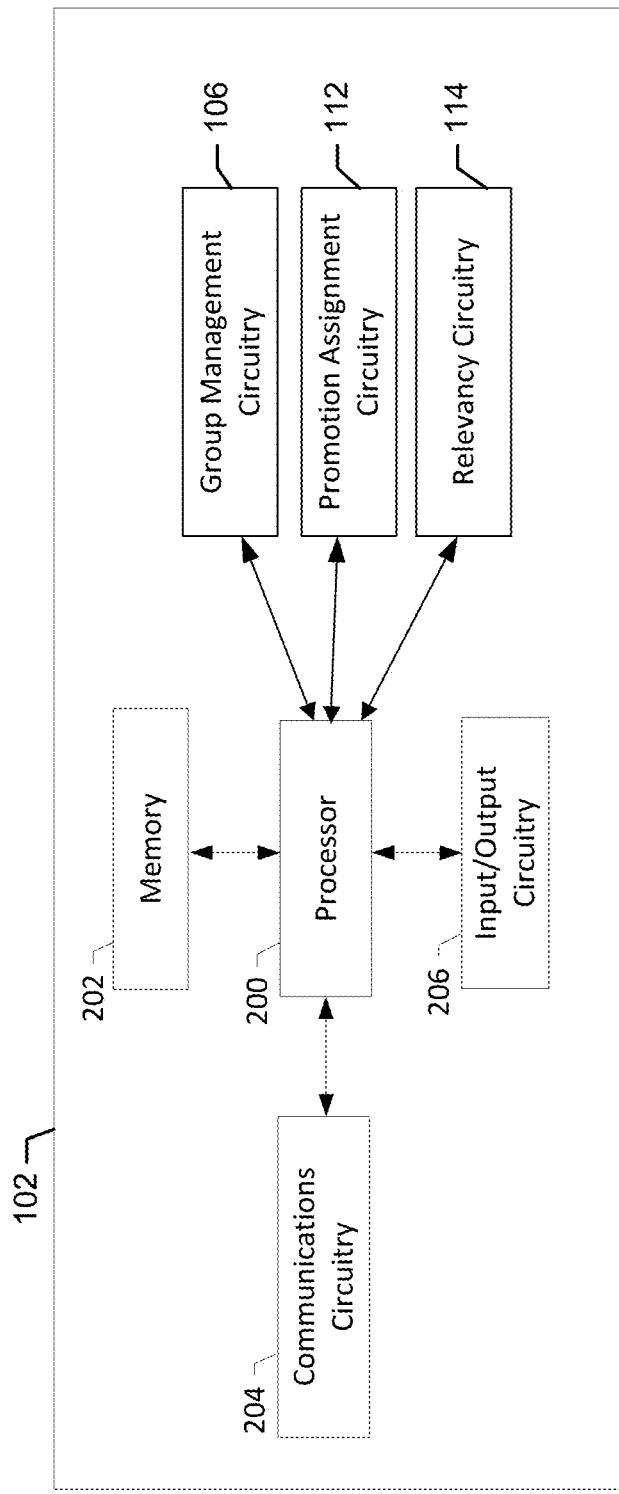

Having thus described embodiments of the invention in general terms, reference will now be made to the accompanying drawings, which are not necessarily drawn to scale, and wherein:

FIG. 1 is a schematic representation of a promotional system in accordance with some example embodiments;

FIG. 2 is a schematic block diagram of an apparatus used in an implementation of a promotional system in accordance with some example embodiments;

FIGS. 3-6 are illustrations of example interfaces according to some example embodiments; and FIGS. 7, 8A, 8B, 9 and 10 are flowcharts illustrating processes for group gifting in accordance with some example embodiments.

DETAILED DESCRIPTION

Glossary

As used herein, the term "provider" may be used interchangeably with "merchant" and includes a business owner, consigner, shopkeeper, tradesperson, vender, operator, entrepreneur, agent, dealer, organization or the like that is in the business of a providing a good, service or experience to a consumer, facilitating the provision of a good, service or experience to a consumer and/or otherwise operating in the stream of commerce. One example provider may be a running company that sells attire for use by a person who runs or participates in athletic activities.

As used herein, the term "promotion and marketing service" is a service that provides promotion and/or marketing services on behalf of one or more providers that are offering one or more instruments that are redeemable for goods, services, experiences and/or the like by a consumer. The promotion and marketing service may engage in business with a provider to offer a promotion. In some examples, the promotion and marketing service may enter into a contract (e.g., agreement defining the terms of the promotion and roles of the promotion and marketing services and provider with respect to the promotion) with the provider to offer a promotion, as described below. In some embodiments, the promotion and marketing service may provide for the direct sales of goods, assist with making travel reservations, assist with making reservation for services and/or other experiences, and/or the like. For example, a consumer may access an interface provided by the promotion and marketing service to purchase goods, trips, services and/or experiences, and purchase may be fulfilled by a provider. The promotion and marketing service may therefore serve as a facilitator to the purchase. In some embodiments, the promotion and marketing service may receive payment for such goods, trips, services and/or experiences, the payment or portion thereof being made to the provider.

The term "promotion" is a type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may be offered by merchants in an exchange with a consumer. For example, a merchant may offer access to a promotion to a consumer in exchange for a sum of dollars. Promotions may also be created and purchased by the merchant themselves. For example, a merchant may request a set of promotions from a promotion and marketing service, and the promotion and marketing service may provide the merchant with the ability to offer said set of promotions to consumers in exchange for a nominal fee. Promotions are typically described as being associated with a particular merchant or consumer account, whereby the associated merchant or consumer has "ownership" of the promotion in that they may redeem the promotion for a product, good, service, or the like. Redemption may occur by using an instrument associated with the promotion, as described below. An example promotion, using a running apparel company as an example provider, is $25 for $50 toward running shoes. In some examples, the promotion defines an accepted value (e.g., a cost to purchase the promotion), a promotional value (e.g., the value of the resultant instrument beyond the accepted value), a residual value (e.g., the value upon return or upon expiry of one or more redemption parameters), one or more redemptions parameters and/or the like. For example, and using the running company promotion as an example, the accepted value is $25 and the promotional value is $50. In this example, the residual value may be equal to the accepted value.

The term "instrument" may include any type of gift card, tender, electronic certificate, medium of exchange, voucher, or the like that embodies the terms of the promotion from which the instrument resulted and may be used toward at least a portion of the purchase, acquisition, procurement, consumption or the like of goods, services and/or experiences. A consumer or merchant that is associated with a particular promotion may generate an instrument to use the promotion. For example, a consumer may print an instrument comprised of a barcode on a sheet of paper, such that a merchant may scan the barcode with a barcode scanner to redeem the promotion. As another example, a consumer may associate the promotion with their particular mobile device, such that the mobile device transmits a code via near-field communication to a near-field communication receiver, and the transmitted code acts as the instrument. Upon use of the instrument, the promotion may be marked by the promotion and marketing system as redeemed, such that a particular promotion may not be redeemed more than once (unless, for example, the consumer purchases a quantity of more than one of the promotion). In some embodiments, instruments may be associated with particular consumers in addition to particular promotions, and transfer of the promotion to another consumer as described herein may cause a revocation of any instruments associated with the first consumer. In some examples, the instrument may take the form of tender that has a given value that is exchangeable for goods, services and/or experiences and/or a reduction in a purchase price of a particular good, service or experience.

In some examples, the instrument may have multiple values, such as accepted value, a promotional value and/or a residual value. For example, using the aforementioned running company as the example provider, an electronic indication in a mobile application may show $50 of value to spend at the running company, and access to the promotion may be provided in exchange for $25. In some examples, the accepted value of the instrument (e.g., $25) may be defined by the value exchanged for the instrument, and the promotional value (e.g., $50) may be defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "service" may describe an action offered by a merchant in exchange for compensation. In this regard, a service may be a general descriptor of the action, and need not include information such as a duration, frequency, total number of times that the action will be performed, or even the compensation necessary for performance of the action. Using the aforementioned running company, an example service may be a private coaching session. In this example, the service itself need not include the duration of the coaching, the frequency of the lessons, the number of lessons that will be provided, or the cost of the lesson.

As used herein, the term "gift" may describe a good, service, experience, promotion and/or the like, purchased by a consumer for another consumer. In this regard, the gift may be a product, that, when purchased by a gift giver via the promotion and marketing service, is shipped to the recipient. The gift may be a form of tender redeemable for a service or experience. A gift may be a promotion, that, when purchased by a gift giver, is assigned to a recipient such that the recipient may redeem the promotion for a good, vacation, service, or experience. Although instant examples herein generally describe gifts as promotions, referencing the purchase of a promotion by a gift giver, and assignment of the promotion to a recipient, it should be readily apparent that such systems could be modified to also include selecting, purchasing, and shipping physical goods, booking travel packages, and/or various other e-commerce activities.

As used herein, "explicit data" may describe data relating to a consumer that is directly provided to the promotion and marketing service such as via a survey, user preferences, profiles, and/or registration information. In this regard, the consumer may knowingly provide information relating to the consumer's interests, geographic location, demographics, and/or the like to the promotion and marketing service. As used herein, "implicit data" may include data that may be user-provided for a purpose other than for use by the promotion and marketing service and/or that may be detected by the promotion and marketing service with or without the consumer's knowledge. Example implicit data may include a user's browsing history, detected location, or the user's social network profile information, and/or purchase history relating to the promotion and marketing service and/or other retailers, for example. Explicit and implicit data is described in more detail in U.S. patent application Ser. No. 13/900,536, which is incorporated herein by reference in its entirety.

As used herein, a "relevancy score," or "score" is a quantified estimate of suitability of a gift, such as a good, vacation, service, experience, and/or promotion for a particular consumer or group of consumers. The relevancy score may be based on explicit data and/or implicit data, for example. A gift having a high relevancy score for a consumer may be a gift of high interest to the consumer, while a gift having a low relevancy score may be of low interest. In some embodiments, a relevancy score may indicate a ranking of a group of gifts based on the suitability or relevancy of the gifts for a particular consumer. Relevancy scores are described in more detail in U.S. patent application Ser. No. 13/411,502, which is incorporated herein by reference in its entirety.

Overview

In some instances, a promotion and marketing service as introduced above provides services on behalf of one or more providers that are offering one or more instruments that are redeemable for goods, services, experiences and/or the like by a consumer. The promotion and marketing service may engage in business with a provider to offer a promotion such that revenue may be generated for both the provider and the promotion and marketing service. The promotion and marketing service may be implemented by a promotion and marketing system that analyzes market conditions and data to optimize profits to the promotion and marketing service and providers. In current implementations, promotion and marketing services may be limited to advertising methods such as providing daily offers to consumers targeted based on consumer profiles and/or the like. Improvements to such promotion and marketing systems may be made by enabling peer to peer encouragement of promotion purchasing, such as with a group gift exchange. By providing an infrastructure to enable consumers to invite other consumers and form group gift exchanges by which promotions purchased from the promotion and marketing service and redeemable at a provider, are exchanged, the promotion and marketing system may be improved in comparison to previous methods for marketing the sale of promotions.

Other organized group gift exchanges, such as for holidays or other events, often present an organizational hassle for participants. In many cases, a group leader or family member must ensure that each participant is matched with another participant for assignment of gifters and recipients. In some cases, it may be difficult to gather the entire group in one location prior to the exchange in order to draw names, and in some cases, it may be difficult to gather the group to exchange gifts.

Even group gift exchanges facilitated by a web service or similar environment have drawbacks. In many group gift exchanges, participants must think of a gift to purchase for an assigned recipient, and in some cases the gift giver may not know the recipient well enough to choose an appropriate gift. The gift giver may have to travel to multiple retail stores to purchase a gift, wasting time browsing for an appropriate gift for the recipient. In some cases, a participant may forget to purchase or choose not to purchase a gift for an assigned recipient, leaving at least one participant without a gift. In some cases, a generous gift giver may purchase a gift exceeding an agreed upon amount or range, causing the recipient to feel guilty about the over-budget gift, while some gift givers may spend less than a minimum agreed upon amount, leaving the recipient feeling cheated. In many gift exchanges, recipients receive gifts of little interest or value to the recipient and the gift goes unused or wasted.

Embodiments of the present invention may facilitate group gift giving by providing a framework for registration with and management of a group gift giving program. Embodiments may allow consumers to register with a particular group, or consumers may be randomly assigned to a particular group. Embodiments may provide an interface that allows a group of consumers to register for the gift giving program together, such as by an administrator creating the group via an interface provided by embodiments, and facilitating inviting other consumers to join the group. Embodiments may provide for ongoing management of the group, and may also facilitate purchase and delivery of gifts purchased by group members for other group members.

In some embodiments, a relationship between a gift giver and recipient may be anonymous, such that the gift giver and/or recipient may not receive any information regarding the other but may nevertheless give and receive gifts. Similar to the known game of "Secret Santa," in some embodiments, the recipient's identify may be made available to the gift giver, but the recipient may not be informed of the gift giver's identify (until, in some embodiments, the gift is delivered). In some embodiments, the gift giving program may therefore replicate the drawing of a name from a hat by a gift giver to identify an assigned recipient.

The above described gift giving program may be implemented so as to integrate with the promotion and marketing service. Discounts and promotions have been used as part of some retail strategies. In this regard, a promotion and marketing service may assist providers by facilitating the distribution of promotions to consumers. The promotion and marketing service may ensure that promotions are provided in an organized and efficient manner in order to maximize the return on investment (ROI) and marketing utility received by the provider from the promotions. The promotion and marketing service and/or promotion and marketing system may be improved by enabling an increase in the sales of goods and promotions by facilitating gift giving of goods and/or promotions in a group of consumers, thereby further increasing the ROI for a provider, in addition to improving group gift giving experiences for participants.

The promotion and marketing service may also recommend to a gift giver a plurality of gifts for a recipient, and/or may identify the gift, such as a promotion, automatically. For example, the promotion and marketing service may utilize recipient preference data associated with a recipient to recommend a particular gift for the recipient to the gift giver. Such recommendations may further result in an improvement to the promotion and marketing system based on higher redemption rates of purchased promotions due to the relevancy of a gift for the recipient.

Once a gift is purchased by the gift giver, a product may be shipped to the recipient, and/or a promotion may be assigned to the recipient and may be made available for redemption. The promotion and marketing service may therefore facilitate the gift giving relationship, the purchase of the gift by the gift giver, and/or the delivery of the gift to the recipient. Groups of consumers, such as family members, co-workers, and/or organizations may find the gift giving program to be an efficient means for exchanging gifts, which may ultimately lead to an increase in business and/or ROI for the promotion and marketing service and/or providers associated with the gifts.

Implementation of Exemplary Embodiments

Embodiments of the present invention now will be described more fully hereinafter with reference to the accompanying drawings, in which some, but not all embodiments of the inventions are shown. Indeed, embodiments of the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information" and similar terms may be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, and/or the like.

FIG. 1 is a schematic representation of a promotional system that may benefit from some example embodiments of the present invention. The system 100 may include one or more devices and sub-systems that are configured to implement some embodiments as discussed herein. For example, the system 100 may include a promotion and marketing service 102. The promotion and marketing service 102 may communicate with any number of consumer devices 104-104n, or for simplicity, referred to as consumer device(s) 104 hereinafter. The promotion and marketing service 102 may store information relating to promotion assignments within a promotion assignment database 118. The promotion and marketing service 102 may provide for the gifting of gifts in a group, in accordance with embodiments described herein.

The consumer device(s) 104 may each be implemented as a personal computer and/or other networked device, such as a cellular phone, tablet computer, mobile device, etc., that may be used for promotion and marketing service 102 in order to participate in the gift giving program, configure a profile and/or group information, give and/or receive gifts, redeem promotions received as gifts, and/or the like. The consumer device 104 may additionally or alternatively be used to provide explicit and/or implicit data to the promotion and marketing service 102. In some embodiments, the consumer device 104 may be capable of detecting a real time location, and provide the location to the promotion and marketing service 102, as described herein.

In the present context, each consumer device 104 is generally described as being associated with unique consumers. However, embodiments of the invention may be equally applicable to scenarios where a first consumer and a second consumer (e.g., gift giver and recipient) utilize the same device. As such, the examples herein should not be construed to be limited to embodiments requiring separate devices.

The promotion and marketing service 102 may function as a host or server computer to facilitate the gifting of gifts in a group. In some embodiments, the promotion and marketing service 102 may be configured to receive requests for and to provide gifts via a web interface. The promotion and marketing service 102 may comprise group management circuitry 106, promotion assignment circuitry 112, and relevancy circuitry 114. Each of the circuitry 106, 112, and/or 114 may be implemented as hardware, software, or a combination of the two as described below with respect to FIG. 2.

It should also be understood that certain of these components 106, 112, and/or 114 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of promotion and marketing service 102 may provide or supplement the functionality of particular circuitry.

The group management circuitry 106 may provide functionality related to assigning consumers to groups, determining relationships between gift givers and recipients within a group, facilitating the giving of gifts, and/or the like. For example, a consumer may register for the gift giving program via an interface provided by the group management circuitry 106, and may provide group information for which the consumer wishes to join, and/or an indication to be randomly placed in a group. In embodiments, once a group is established including a group of consumers (e.g., user accounts), the group management circuitry 106 may determine relationships between the consumers of the groups.

In some embodiments, the relationships may be determined randomly, replicating the drawing of names from a hat. In some embodiments, the relationships may be determined based on explicit and/or implicit data. For example, the group management circuitry 106 may identify a relationship between a gift giver and recipient based on the giver and recipient having similar demographics and/or interests.

As an example, for a group comprising 4 consumers named Sally, Bob, Suzy and Joe, the gift management circuitry 106 may determine (gift giver, recipient) relationships as follows: (Sally, Bob), (Bob, Joe), (Suzy, Sally), and (Joe, Suzy). Sally may therefore give a gift to Bob, Bob to Joe, Suzy to Sally, and Joe to Suzy. Each consumer in the group may therefore gift a gift and receive a gift. Group management circuitry 106 may ensure that every member of a group is paired with another member of the group as both a gift giver and a gift recipient, and it should be appreciated that such relationships may or may not be reciprocal. Alternatively, in some embodiments, gift givers and gift recipients may be associated with different assignment pools. For example, in a charitable giving configuration, users may register as gift givers and be assigned to designated recipients, with users registering as gift givers not added to the assignment pool of recipients. In some embodiments, group management circuitry 106 may notify the gift givers and/or recipients of the determined relationships. Additionally or alternatively, the group management circuitry 106 may facilitate the purchase of a gift by a gift giver of the group.

The promotion assignment circuitry 112 may provide functionality relating to assigning a purchased promotion from a gift giver to a recipient. The promotion assignment circuitry 112 may facilitate giving of the promotion from a gift giver to a recipient by assigning the promotion to the second consumer within the promotion assignment database 118 in response to a purchasing operation performed by the gift giver. For example, the promotion assignment database 112 may include references for each promotion offered by the promotion and marketing system 102, and to which consumers those promotions are associated. As one specific example, the promotion may be transferred between the consumers by modifying the consumer to which the particular promotion is associated. The recipient consumer may be provided to the promotion assignment circuitry 112 by the group management circuitry 106, for example. In some embodiments, the promotion assignment circuitry 112 may notify the recipient of the gift when the transfer is complete. Alternatively, some embodiments may support gifting of promotions that were previously purchased or otherwise assigned to the gift giver. More detail regarding the assignment of promotions and various example embodiments for facilitating the transfer process is provided in U.S. patent application Ser. No. 13/786,828, which is herein incorporated by reference in its entirety.

The relevancy circuitry 114 may provide functionality related to the relevancy of gifts for particular recipients. As such, the group management circuitry 106 may provide information related to the recipient to the relevancy circuitry 114. For example, this information may include explicit and/or implicit information as described above. The relevancy circuitry 114 may therefore access available gifts, and rank or score the relevancy of each gift relative to the recipient. The relevancy circuitry 114 may then provide a recommended gift or gifts to the group management circuitry 106, to be subsequently indicated to the gift giver as recommendations for the recipient, automatically purchased as part of the group gifting process, and/or the like. As another example, the relevancy circuitry 114 may score gifts based on factors such as cost of the gift (such as in comparison to a target price and/or price range set for the group and provided by the group generation circuitry 106). In some embodiments, the recipient may select gifts to place on a wish list during the gift giving program registration. The relevancy circuitry 114 may score the gifts present on the wish list higher than those not on the wish list. Gifts may additionally or alternatively be scored based on the location of the associated provider and the location of recipient, a type of service and the interests of the recipient, and/or the like.

The promotion and marketing service 102 and consumer devices 104 may communicate with one another via a network 116. The network 116 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, the network 116 may include a cellular telephone, an 902.11, 902.16, 902.20, and/or WiMax network. Further, the network 116 may include a public network, such as the Internet, a private network, such as an intranet, or combinations thereof, and may utilize a variety of networking protocols now available or later developed including, but not limited to TCP/IP based networking protocols.

FIG. 2 is a schematic block diagram of an apparatus, such as the promotion and marketing service 102 or consumer device 104, in accordance with example embodiments. The block diagram shows example circuitry that may be included in the promotion and marketing service 102, which may be configured to perform the analysis, management and/or other functionality discussed in connection with the promotion and marketing service 102 described with respect to FIG. 1. As illustrated in FIG. 2 and in accordance with some example embodiments, the promotion and marketing service 102 may include various means, such as a processor 200, a memory 202, a communications circuitry 204, an input/output circuitry 206, a group management circuitry 106, a promotion assignment circuitry 112, and/or a relevancy circuitry 114. In some embodiments, some or all of the components illustrated in and described with respect to FIG. 2 may be implemented on the consumer device 104, and/or on the consumer device 104 acting in concert with the promotion and marketing service 102.

The processor 200 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments, the processor 200 comprises a plurality of processors. The plurality of processors may be embodied on a single computing device or may be distributed across a plurality of computing devices collectively configured to function as circuitry. The plurality of processors may be in operative communication with one another and may be collectively configured to perform one or more functionalities of the promotion and marketing service 102 as described herein. In an example embodiment, the processor 200 is configured to execute instructions stored in the memory 202 or otherwise accessible to the processor 200. These instructions, when executed by the processor 200, may cause the promotion and marketing service 102 to perform one or more of the functionalities as described herein.

Whether configured by hardware, firmware/software methods, or by a combination thereof, the processor 200 may comprise an entity capable of performing operations according to embodiments of the present invention while configured accordingly. Thus, for example, when the processor 200 is embodied as an ASIC, FPGA or the like, the processor 200 may comprise specifically configured hardware for conducting one or more operations described herein. Alternatively, as another example, when the processor 200 is embodied as an executor of instructions, such as may be stored in the memory 202, the instructions may specifically configure the processor 200 to perform one or more algorithms and operations described herein.

The memory 202 may comprise, for example, volatile memory, non-volatile memory, or some combination thereof. Although illustrated in FIG. 2 as a single memory, the memory 202 may comprise a plurality of memory components. The plurality of memory components may be embodied on a single computing device or distributed across a plurality of computing devices. In various embodiments, the memory 202 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory 202 may be configured to store information, data (including group information and information relating to the group's associated consumers), applications, instructions, or the like for enabling the promotion and marketing service 102 to carry out various functions in accordance with example embodiments of the present invention. For example, in at least some embodiments, the memory 202 is configured to buffer input data for processing by the processor 200. Additionally or alternatively, in at least some embodiments, the memory 202 is configured to store program instructions for execution by the processor 200. This stored information may be stored and/or used by the promotion and marketing service 102 during the course of performing its functionalities.

The communications circuitry 204 may be embodied as any device or means embodied in circuitry, hardware, a computer program product comprising computer readable program instructions stored on a computer readable medium (e.g., the memory 202) and executed by a processing device (e.g., the processor 200), or a combination thereof that is configured to receive and/or transmit data from/to another device, such as, for example, the consumer device(s) 104, and/or the like. In some embodiments, the communications circuitry 204 (like other components discussed herein) can be at least partially embodied as or otherwise controlled by the processor 200. In this regard, the communications circuitry 204 may be in communication with the processor 200, such as via a bus. The communications circuitry 204 may include, for example, an antenna, a transmitter, a receiver, a transceiver, network interface card and/or supporting hardware and/or firmware/software for enabling communications with another computing device. The communications circuitry 204 may be configured to receive and/or transmit any data that may be stored by the memory 202 using any protocol that may be used for communications between computing devices. In this regard, the communication circuitry 204 may include a network interface. In some examples, the communications circuitry 204 may comprise an e-commerce interface for initiation transactions with third party servicers such as credit card payment systems. The communications circuitry 204 may additionally or alternatively be in communication with the memory 202, the input/output circuitry 206 and/or any other component of the promotion and marketing service 102, such as via a bus.

The input/output circuitry 206 may be in communication with the processor 200 to receive an indication of a user input and/or to provide an audible, visual, mechanical, or other output to a user (e.g., a promotional system administrator and/or cloud computer programmer). As such, the input/output circuitry 206 may include support, for example, for a keyboard, a mouse, a joystick, a display, a touch screen display, a microphone, a speaker, a RFID reader, barcode reader, biometric scanner, and/or other input/output mechanisms. The input/output circuitry 206 may include a graphical user interface that may be provided to a consumer via a website. In embodiments wherein the promotion and marketing service 102 is embodied as a server, aspects of the input/output circuitry 206 may be reduced as compared to embodiments where the promotion and marketing service 102 is implemented as an end-user machine (e.g., consumer device and/or merchant device) or other type of device designed for complex user interactions. In some embodiments (like other components discussed herein), the input/output circuitry 206 may even be eliminated from the promotion and marketing service 102. The input/output circuitry 206 may be in communication with the memory 202, the communications circuitry 204, and/or any other component(s), such as via a bus. Although more than one input/output circuitry and/or other component can be included in the promotion and marketing service 102, only one is shown in FIG. 2 to avoid overcomplicating the drawing (like the other components discussed herein).

Circuitry 106, 112 and 114 may also be included for providing the functionality as described above with respect to FIG. 1. In some embodiments, some or all of the functionality of the respective circuitry 106, 112, and 114 may be performed by processor 200. In this regard, the example processes and algorithms discussed herein can be performed by at least one processor 200. For example, non-transitory computer readable media can be configured to store firmware, one or more application programs, and/or other software, which include instructions and other computer-readable program code portions that can be executed to control each processor (e.g., the processor 200) of the components of the promotion and marketing service 102 to implement various operations, including the examples shown above. As such, a series of computer-readable program code portions are embodied in one or more computer program products and can be used, with a computing device, server, and/or other programmable apparatus, to produce machine-implemented processes.

Example Interfaces

Figure 3:
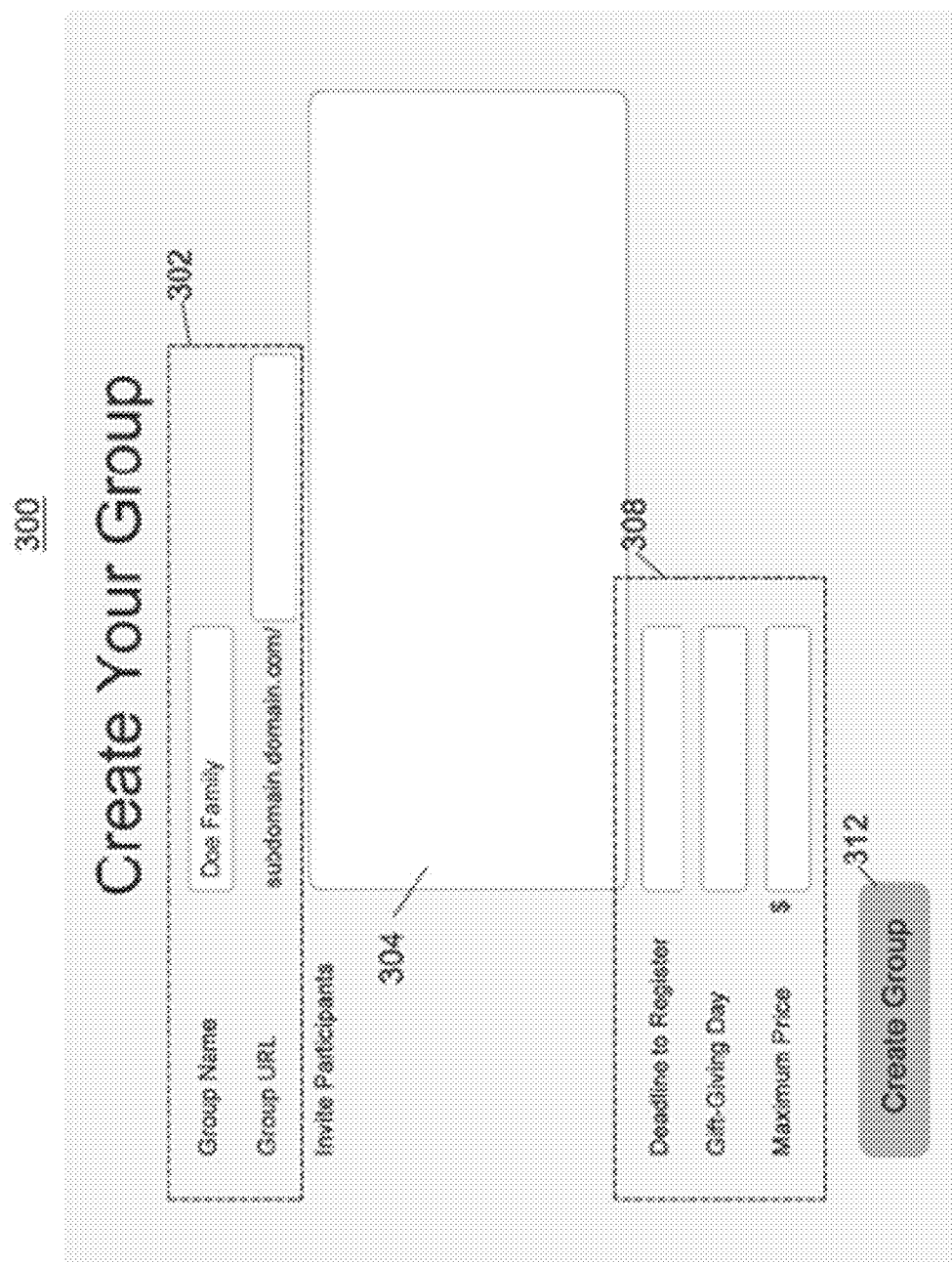

FIG. 3 is an example interface 300 (e.g., graphical user interface) that may be provided by the promotion and marketing service 102 according to some example embodiments. For example, the group management circuitry 106, input/output circuitry 206, and/or the like, may provide the interface 300 to consumer device 104 to be used for creating a gift giving or gift exchange group. The consumer may be considered the administrator of the group, and may provide a group name and uniform resource locator (URL) in area 302. The group name and URL may be unique identifiers for the group, and the URL may provide a group home page for a consumer to access to view information regarding members of the group and the group exchange information. For example, the names of the participants, (gift giver, recipient) relationships, maximum gift cost and/or price range, the gift-giving day, and/or any other information relating to the group may be displayed. An example interface depicting a group home page is described below with respect to FIG. 6. In some embodiments, the group home page may be hosted by the promotion and marketing service and the home page may be automatically generated by the promotion and marketing service upon creation of the group.

In area 304, a consumer may provide email addresses of other consumers to invite to the group. In area 308, the administrator or consumer may provide a deadline to register (e.g., deadline for a consumer to commit to being in the group gift exchange), a gift-giving day, (e.g., deadline for purchasing a gift, and/or the day notification of the gift is to be delivered to a recipient), and the maximum price for a gift exchanged within the group.

Although not illustrated, other information gathered on interface 300 may include a minimum price and/or price range, indications whether additional participants other than those invited may join the group, individual consumer preferences, and/or the like. Furthermore, the interface 300 may provide a list of the consumer's social media contacts for invitation to the group. The consumer may therefore utilize the interface 300 to post a message to friends on a third party social media site. Such functionality may encourage additional consumers to join a gift giving group.

Upon selection of a confirmation button 312, the group management circuitry 106 may generate the group. Generating the group may include storing a unique identifier of the group in memory 202, and associating it with the invited participants and/or registered participants, and/or other pertinent details collected with respect to interface 300. In some embodiments, emails may be automatically transmitted to the invited participant, informing them of the group exchange, providing a URL to the group page, and inviting them to accept the invitation to join the group gift exchange.

In some examples, in order to join the group, the invited member may be required to provide a commitment in the form of a credit card to be charged on the gift-giving day in the event the consumer does not purchase a gift for the assigned recipient. The payment information may be verified for validity and/or completeness and stored in memory 202. In some embodiments, the participant may not be assigned to a group until the payment information is verified and/or validated. In such examples in which the gift giver does not purchase a gift for a recipient, the group management circuitry 106 may automatically purchase a gift on behalf of the gift giver for the recipient to ensure every registered recipient in a group receives a gift on the gift-giving day. As such, in some examples, an e-commerce interface of the communications circuitry 204 may be configured to process credit card information and/or other payment information.

For example, payment information such as stored electronic payment information associated with a consumer account may be provided via the e-commerce interface to a payment servicer, such as a bank or credit card company, to place a hold on an account using the payment information by processing a $1.00 payment. In some examples, the payment information and/or hold may need to be verified before allowing a member to join a group. In some examples, such as those in which a minimum price and/or price range is defined, the minimum price may be charged in full to the consumer's account based on payment information provided. Additionally or alternatively, a stored balance and/or gift card associated with the consumer's profile stored on or accessed by the promotion and marketing service 102 may be used to secure payment and allow the consumer to join a group. Therefore, confirmation of valid payment information may be provided via the e-commerce interface such that the group management circuitry 160 then allows a user to join a group.

In some embodiments, upon expiration of the deadline to register, the group management circuitry 106 may identify the gift giving relationships in the group, such as described above with respect to the functionality of circuitry 106. These relationships may be provided to gift givers such that the gift recipients are unaware of their assigned gift giver. For example, gift givers may be sent an e-mail message with the identity of their assigned recipient. Alternatively, gift givers may view their assigned gift recipients via the group home page maintained by the promotion and marketing service.

Figure 4:
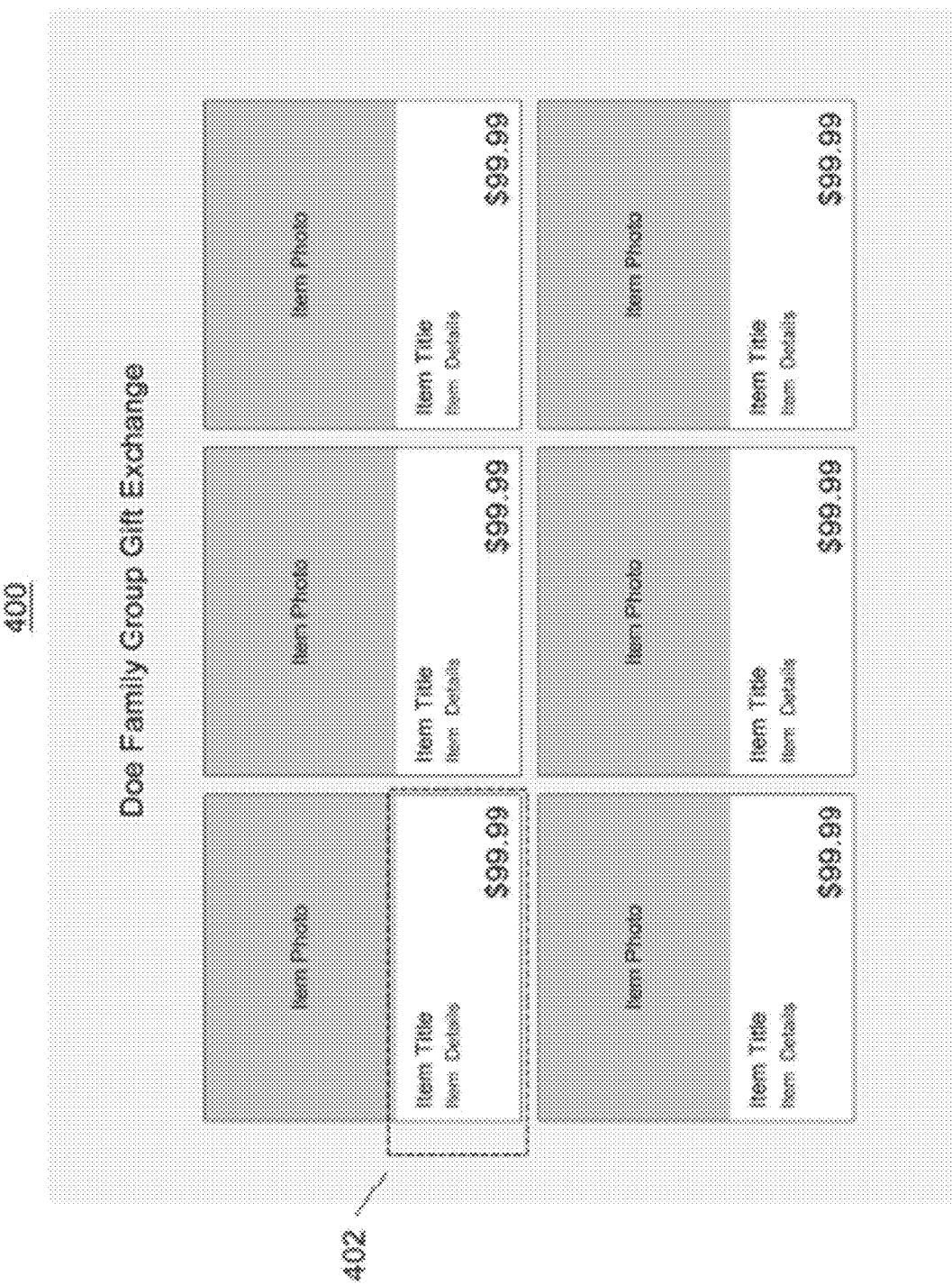

FIG. 4 is an example interface 400 that may be provided by the promotion and marketing service 102 to a consumer participating in a gift giving group. For example, the group management circuitry 106, input/output circuitry 206, and/or the like, may provide interface 400 via a consumer device 104. The interface may be provided when accessing the group page URL provided on interface 300, for example. In general, interface 400 provides status information regarding the gift giving group. The status information may comprise an indication of whether at least one member of the gift giving group has purchased a gift for at least one other member of the gift giving group. In some embodiments, the interface 400 may provide gifts relevant for the group and/or a particular recipient. In this regard, the gift information, such as promotion information, to be displayed in interface 400 may be identified and provided by relevancy circuitry 114, as described above with respect to FIG. 1. The consumer (e.g., gift giver) may use the interface 400 to browse gift information 402, which may include a provider name, service or product, category, and cost of the gift to the consumer. The consumer may select any of the gift information 402 to view additional details and/or to indicate to purchase the gift (not shown). In some embodiments, the interface may include a brief description of why each gift was selected for the particular gift recipient. For example, a text blurb may indicate that a particular gift was selected because the recipient has previously purchased gifts and/or promotions from the same merchant (e.g., "Recipient has visited this restaurant several times"), another promotion is displayed because it matches the recipient's particular interests (e.g., "Recipient has indicated in their profile that they enjoy skiing, so here is a promotion for 50% off a local lift ticket"), and yet another promotion is displayed because it is local to the recipient (e.g., "Recipient works nearby to this coffee shop").

Figure 5:
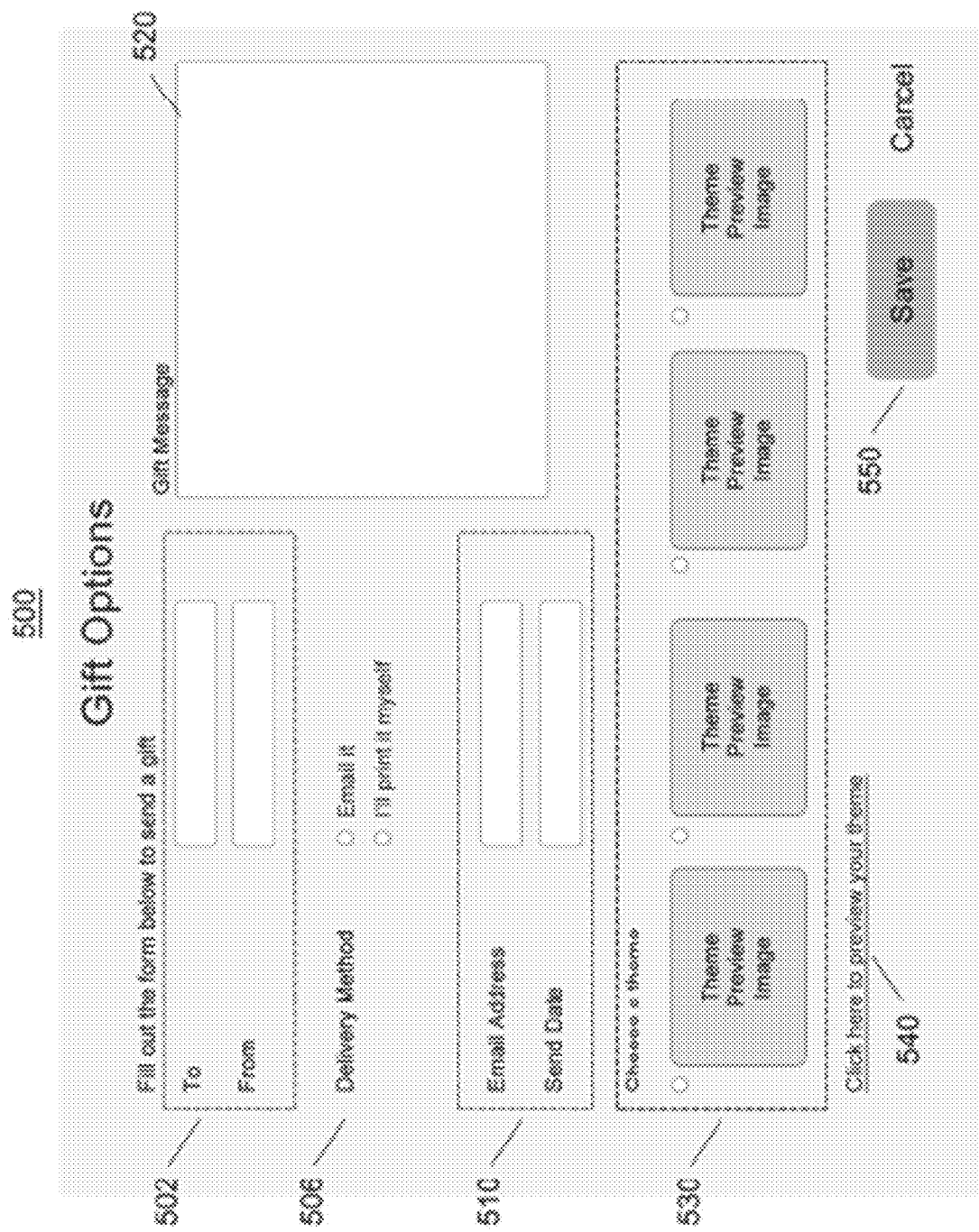

Upon receiving an indication to purchase a gift, a consumer may be presented with an interface 500 of FIG. 5, which may be provided by the promotion and marketing service 102. For example, the group management circuitry 106, input/output circuitry 206, and/or the like, may provide the interface 500 to a consumer to complete the purchase of a gift.

In area 502, the gift giver may provide the name of a gift recipient and their own name as the gift giver. In some embodiments, such as those in which the gift giver is logged on and the relationship to the recipient is established, the "to" and "from" fields may be prefilled. With indicator 506, the gift giver may indicate whether notification of the gift should be emailed to the recipient or if the gift giver will print the notification of the gift for personal delivery. The email option may result in the email being automatically generated on the gift-giving day, or date provided in area 510. Indicating the gift giver will print the notification may result in a generated notification such as a document configured for printing and including information regarding the gift, such as promotion redemption instructions.

In area 510, the gift giver may provide the email address of the recipient, and date to send the notification (which may only apply when the notification is to be sent by email). The email address and send date may, in some embodiments, be prefilled based on information provided via the interface 300. In area 520, the gift giver may provide a message to be included in the notification to the recipient, to be sent by email, or to be printed and hand delivered. The gift giver may also select a theme in area 530, defining the style, color scheme, and fonts of the notification. The gift giver may view a preview of the notification by selecting link 540. The selected gift may be purchased and/or saved for later upon the selection of button 550.

In response to the indication from the gift giver to purchase the gift, the group management circuitry 106 may store data in memory 202 indicating that the gift has been purchased. In instances where the gift is a promotion, the indication may be provided to the promotion assignment circuitry 112 so that on or before the gift-giving day, the promotion may be assigned from the gift giver to the recipient in accordance with the functionality of the promotion assignment circuitry 112 described with respect to FIG. 1 above.

Figure 6:
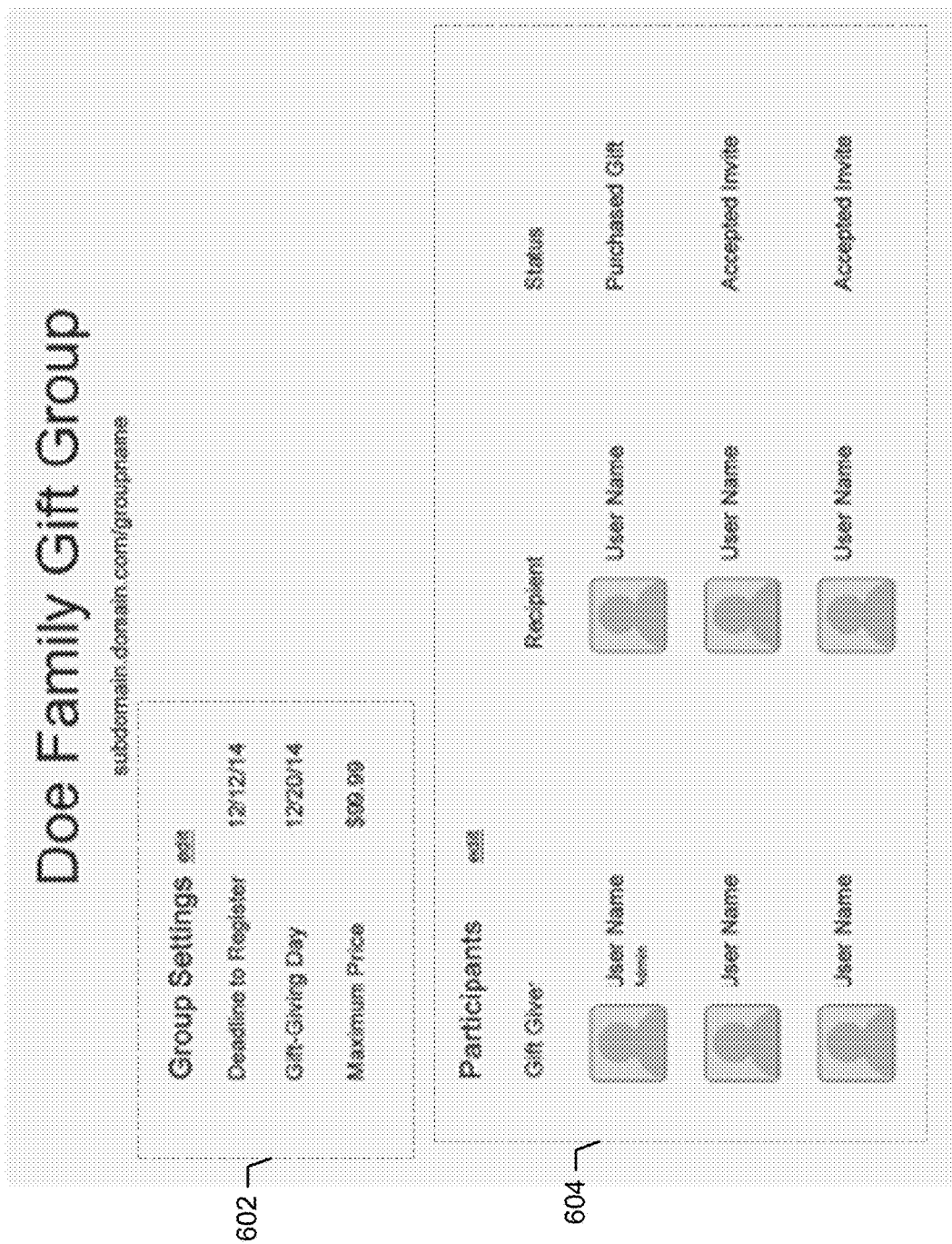

FIG. 6 depicts an example of an interface 600 for providing a group home page in accordance with embodiments of the present invention. The group home page may provide users with information about the status of a group gifting operation. For example, the group home page may display an indication of which users have been invited to join the group, which users have registered with the group, which users have purchased gifts, and the like. In some embodiments, the group home page may be restricted to viewing by one or more administrative users (e.g., a group organizer). In other embodiments, all users may have access to the group home page. In yet further embodiments, administrative users may be provided with additional information unavailable to other, non-administrative users. For example, a group administrator may be able to view gift giving assignments between gifters and recipients, while non-administrators may not.

The interface 600 depicts a set of group configuration settings 602. The group configuration settings may inform the viewer of the interface 600 of the current settings associated with the group, such as the group registration deadline, the group gift purchase deadline, the maximum and/or minimum gift values, or the like.

The interface 600 may also depict group status indications 604. The group status indications 604 may indicate, as in the present example, which gifter is assigned to which gift recipient, and whether the gifter has purchased a gift for the recipient. The group status indications 604 may dynamically update in response to status changes. For example, in response to receiving a gift purchase trigger, the group status indications 604 may be updated with an indication that the gift has purchased a gift for the recipient. As further examples, the group status indications 604 may be updated in response to a user registering with the group, in response to group gifting assignments being made, in response to initial invitations being sent (e.g., a "not yet registered" status for users who have been sent invitations but who have not yet responded), in response to a user declining to join the group, or the like.

Example Processes and Methods

Figure 7:
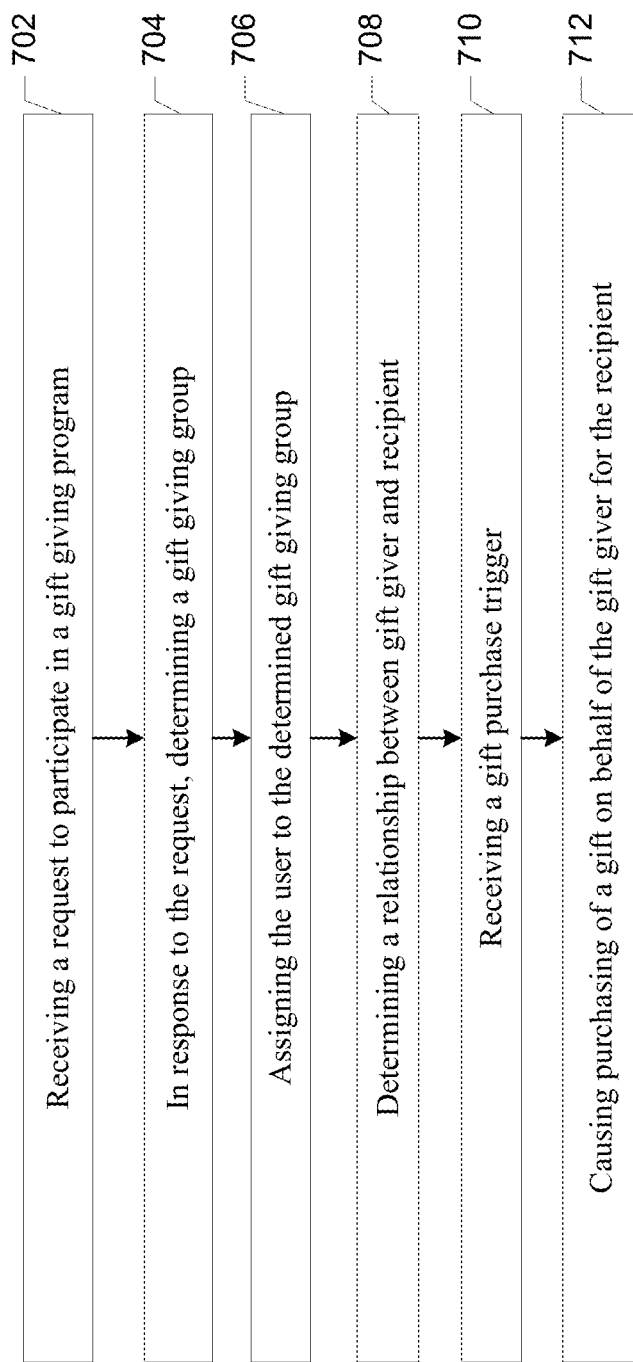

FIG. 7 is a flowchart describing a process for providing group gifting operations in accordance with some example embodiments. As described above, in some embodiments group gifting operations may be provided that allow a user to register with the promotion and marketing service for assignment to a group selected by the promotion and marketing service. For example, a user may join a random pool for assignment to a gifting group, or the user may be assigned based on certain user characteristics, such as the user's location. The operations of FIG. 7 may be performed by the promotion and marketing service 102 and are example operations that illustrate how the promotion and marketing service 102 may facilitate group gifting, such as in a randomized format, where participants do not register for a particular group. In particular, the flowchart of FIG. 7 describes formation of a group, establishment of gift giving relationships, and the purchase of gifts.

As shown by operation 702, the promotion and marketing service 102 may include means, such as group management circuitry 106, communications circuitry 204, processor 200, and/or the like, for receiving a request associated with a first user account to participate in a gift giving program. For example, a consumer may use a consumer device 104 to access an interface provided by the promotion and marketing service 102, such as interface 300, to indicate they wish to participate in the gift giving program. Some requests may indicate the specific gift giving group in which the consumer wants to participate, and others may indicate they wish to be randomly assigned to a group. The request may include personal information such as user credentials established with the promotion and marketing service 102, and/or details required to register as a new user with promotion and marketing service 102.

As shown by operation 704, the promotion and marketing service 102 may include means, such as group management circuitry 106, processor 200, and/or the like, for, in response to the request, determining a gift giving group to which to assign the first user account. As such, the first user account may be assigned to a gift giving group at random, if so indicated, or to the gift giving group in which the consumer associated with the first user account registered. In examples in which the consumer requested participation in the form of acceptance of an invitation, the consumer may be automatically assigned to the gift giving group from which the invitation originated. In some embodiments, determining the gift giving group comprises determining the gift giving group at random, and the determining a relationship between the first user account and a second user account comprises determining the relationship at random.

As shown by operation 706, the promotion and marketing service 102 may include means, such as group management circuitry 106, processor 200, memory 202 and/or the like, for assigning the first user account to the identified gift giving group. As such, in some examples, the memory 202 may be updated with information linking the first user account to a unique identifier of the gift giving group.

As shown by operation 708, the promotion and marketing service 102 may include means, such as group management circuitry 106, processor 200, memory 202 and/or the like, for identifying a relationship between the first user account and a second user account, wherein the second user account is assigned to the gift giving group and the relationship identifies the first user account as a gift giver and the second user account as a recipient. As described above, the group management circuitry 106 may be configured for generating relationships in the form of a (gift giver, recipient) pair. The association may be made in memory 202. A notification may be generated and provided to the gift giver and/or recipient informing the gift giver and/or recipient of the relationship. In some example embodiments, (gift giver, recipient) pairs may be determined anonymously such that the gift giver may purchase a gift for a recipient whose identity is unknown the gift giver, and/or the gift giver's identity is unknown to the recipient.

As shown by operation 710, the promotion and marketing service 102 may include means, such as group management circuitry 106, processor 200, input/output circuitry 206, communications circuitry 204, and/or the like, for receiving a gift purchase trigger associated with the relationship between the first user account and the second user account. A gift purchase trigger may be some indication provided to the promotion and marketing service 102 to initiate or otherwise facilitate purchasing of a gift on behalf of a gift giver and for a recipient. Receiving a gift purchase trigger may therefore indicate that a gift should be purchased by the first user account to be gifted to the second user account. Receiving a gift purchase trigger may therefore cause the gift to be purchased. Generation of a gift purchase trigger is described in further detail with respect to FIGS. 8A and 8B below.

As shown by operation 712, the promotion and marketing service 102 and/or promotion assignment circuitry 112 may include means, such as the processor 200, the memory 204, the promotion assignment database 118, and/or the like, for in response to receiving the gift purchase trigger, causing purchasing of a gift on behalf of the first user account, such that the gift is to be gifted to the second user account. In instances the gift is a good or product, the purchase may indicate to the promotion and marketing system 102 that the good or product should be shipped to the recipient.

In some embodiments, such as in an instance where the gift is a promotion, the promotion may be identified by the gift purchase trigger and originally assigned to the purchaser (e.g., gift giver). The information regarding the purchase and intent to gift the promotion may be provided to the promotion assignment circuitry 112. The promotion assignment database 118 may be updated to reflect the assignment of the promotion from the gift giver to the recipient. Upon completion of the assignment, the promotion may no longer be associated with the first user account, but should be assigned and associated with the second user account. The consumer associated with the second user account (e.g., the recipient), may then access the promotion information, and redeem the promotion to obtain a good, service, or experience. In some embodiments, a gift is automatically identified based on a relevancy score for the second user account, such as by the relevancy circuitry 114.

Figures 8A, 8B:
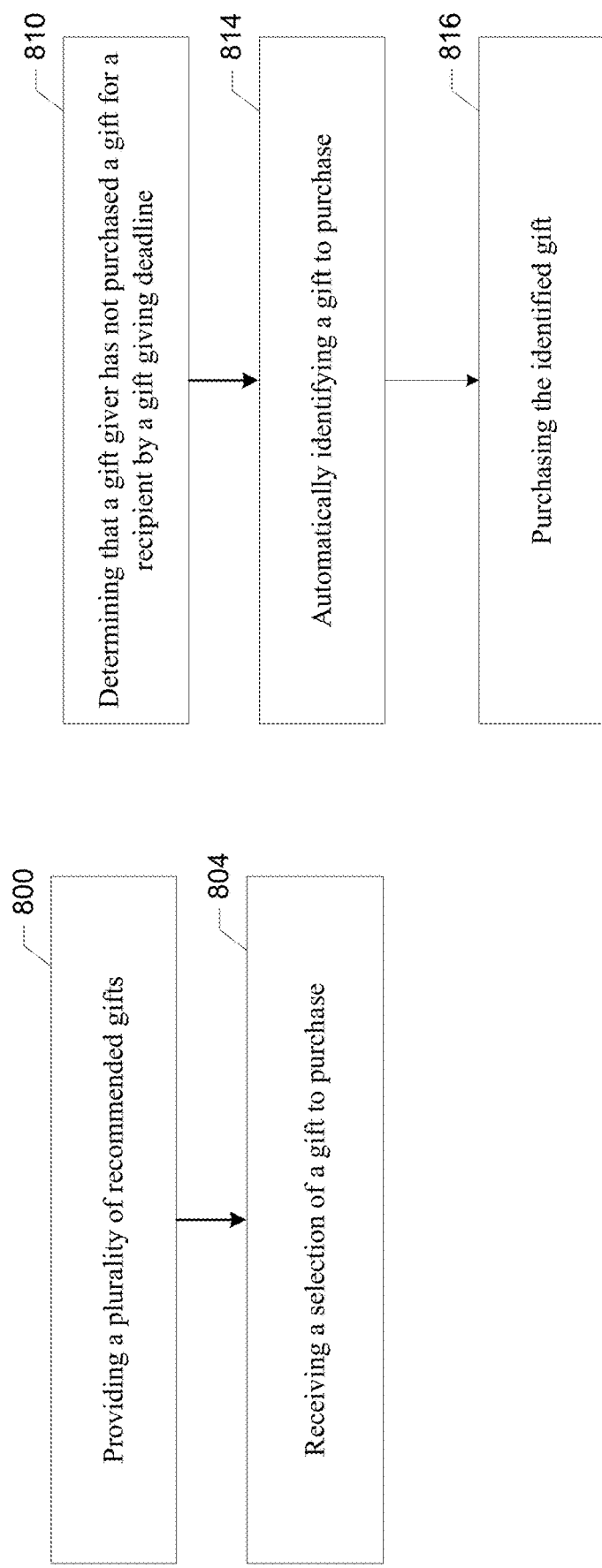

FIGS. 8A and 8B are flowcharts describing processes for generating gift purchase triggers, in accordance with some example embodiments. As described above, receiving a gift purchase trigger may result in the promotion and marketing service 102 purchasing a gift on behalf of a gift giver and for a recipient. These gift purchase triggers may be used by the promotion and marketing service to manage the gifting group by detecting when gifts have been purchased to ensure that all recipients within the group receive a gift. FIGS. 8A and 8B provide example operations of how a gift purchase trigger may be generated.

As shown by operation 800 of FIG. 8A, the promotion and marketing service 102 may include means, such as the group management circuitry 106, the relevancy circuitry 114, the processor 200, and/or the like for providing a plurality of recommended gifts for the recipient based on a relevancy score of each of the plurality of the recommended gifts. Such gifts may be provided via the interface 400, for example. The relevancy circuitry 114 may receive information regarding a recipient, such as explicit and/or implicit data, for example, from the group management circuitry 106. The relevancy circuitry 114 may then access available gifts, such as from the memory 204, and rank and/or score the relevancy of each gift with respect to the recipient. A subset of gifts, based on the relevancy scores, may be then provided to the gift giver.

As shown by operation 804, the promotion and marketing service 102 may include means, such as the group management circuitry 106, the communications circuitry 204, the input/output circuitry 206, the processor 200, and/or the like for receiving an indication of a selection by the gift giver of at least one of the plurality of recommend gifts. For example, with use of the interface 400, a gift giver may select one of the recommended gifts to purchase. In some embodiments, a single and/or top ranked gift may be identified for a recipient, and the gift giver may confirm to purchase the identified gift.

FIG. 8B is a flowchart of alternative or additional operations for generating a gift purchase trigger, according to an example embodiment. As shown by operation 810, the promotion and marketing service 102 may include means, such as the group management circuitry 106, the communications circuitry 204, the input/output circuitry 206, the processor 200, and/or the like for determining, following expiration of a gift-giving deadline, that the gift giver has not purchased a gift for the recipient. In some embodiments, the gift-giving deadline may be considered the gift-giving day as indicated on the interface 300. In some embodiments, the gift-giving deadline may be another day, such as a day prior to the gift-giving day. In yet further embodiments, the gift-giving deadline may be calculated based on the gift-giving day, such as by determining a minimum shipping time for delivering a good or product or mailing an instrument associated with a gift, and subtracting the minimum shipping time from the gif-giving day. The group management circuitry 106 may therefore determine that for an identified relationship (gift giver, recipient), a gift has not yet been purchased.

As shown by operation 814, the promotion and marketing service 102 may include means, such as the relevancy circuitry 114, the processor 200, and/or the like, for in response to the determination, automatically identifying a gift for purchasing on behalf of the first user account. For example, the relevancy circuitry 114 may identify a top scored gift for the recipient. In some embodiments, the automatically identified gift may be purchased.

At operation 816, the promotion and marketing service may purchase the identified gift. As described herein, in some embodiments, the group management circuitry 106 may require a consumer's credit card information upon commitment to participate in a gift giving group. As such, the group management circuitry 106 may initiate the purchase of a gift on the gift giver's behalf.

Figure 9:
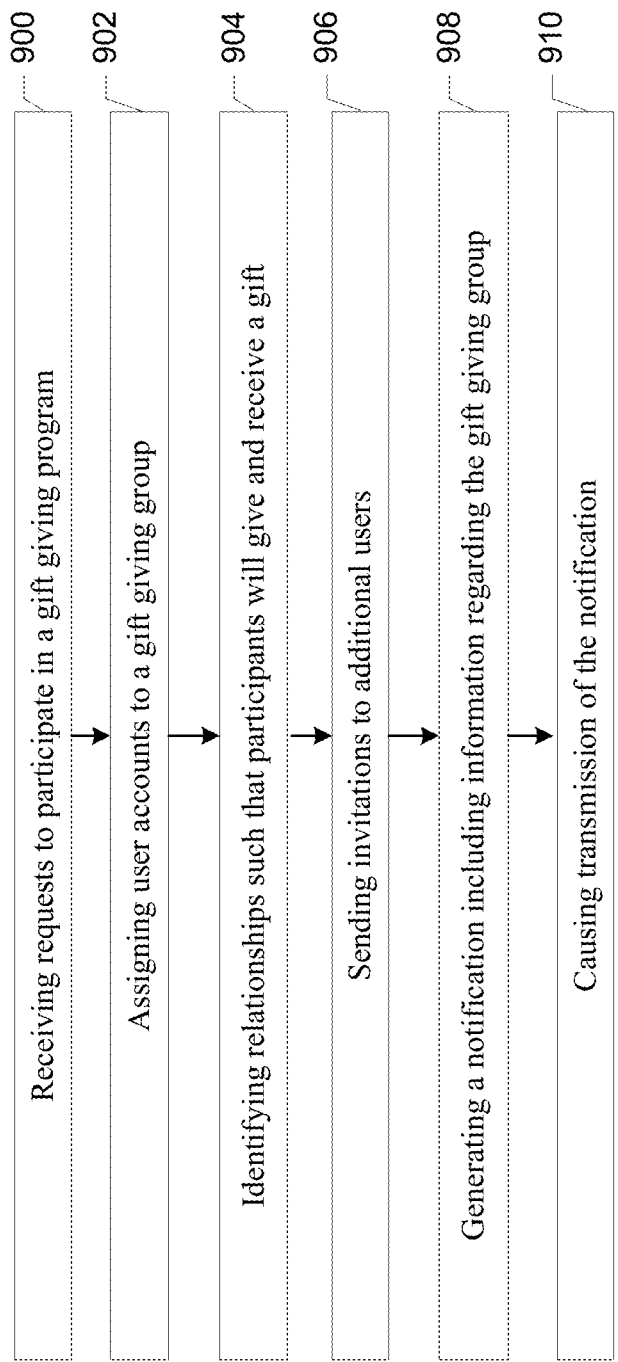

FIG. 9 is a flowchart of a process for managing group gifting operations according to some example embodiments. The process described in FIG. 9 may provide a user with the ability to select a particular group, such as by providing an identifier associated with the particular group or activating a registration link (e.g., as received in an invitation e-mail) that notifies the promotion and marketing service of the group the user intends to join. For example, employees at a particular workplace may organize a gift giving group, and a group leader may register with the promotion and marketing service. During the registration process, the group leader may provide e-mail addresses for the users who are participating in the group. These users may receive an e-mail with a link or a unique group identifier that allows them to register with the gift giving group via the promotion and marketing service. The process described in FIG. 9 may thus allow for creation and management of a group comprising multiple consumers, the sending of invitations to invite additional consumers, and the formation of relationships amongst the group.

As shown by operation 900, the promotion and marketing service 102 may include means, such as the group management circuitry 106, the communications circuitry 204, the input/output circuitry 206, the processor 200, and/or the like, for receiving a plurality of requests to participate in the gift giving program, each request associated with a unique user account. The requests, for example, may be made by a group creator and provided in the form of email address associated with invitees to the group, which may be followed by an invitation acceptance from an invitee. In some embodiments, requests may be made from individual consumers, and may indicate the gift giving group they wish to join.

As shown by operation 902, the promotion and marketing service 102 may include means, such as the group management circuitry 106, the processor 200, the memory 204 and/or the like, for assigning each of the unique user accounts to the gift giving group.

As shown by operation 904, the promotion and marketing service 102 may include means, such as the group management circuitry 106, the processor 200, the memory 204 and/or the like, for identifying a plurality of relationships such that each of the unique user accounts is identified as a giver in at least one of the plurality of relationships and a recipient in at least a second relationship of the plurality of relationships. Said differently, each consumer participating in the gift giving group may receive a gift, and may be assigned a recipient for which a gift may be purchased.

In some embodiments, relationships may be formed at a particular registration deadline. For example, the group leader may specify a deadline for registration with the group, and assignment of relationships may occur among the users who are registered at the time of the deadline.

In some embodiments, the relationships may not be formed and (gift giver, recipient) pairs may not be notified of one another's identify, until a gift-giving day, for example. Other embodiments may facilitate group gifting similar to a "White Elephant" gift exchange. In some embodiments, the recipient may never know the identity of the giver of the recipient's received gift.

As shown by operation 906, the promotion and marketing service 102 may include means, such as the group management circuitry 106, the processor 200, the communications circuitry 204, the input/output circuitry 206, and/or the like, for receiving an invitation request to send an invitation to an additional user. The request may be made during group creation, such as with the interface 300, and/or the invitation request may be made at another time, following group creation for example. The invitation request may be made by the group creator, and/or any other participant in the gift giving group. In some embodiments, invitation requests may be made via a social media site.

As shown by operation 908, the promotion and marketing service 102 may include means, such as the group management circuitry 106, the processor 200, the memory 204 and/or the like, and in response to the invitation request, for generating a notification including information regarding the gift giving group.

As shown by operation 910, the promotion and marketing service 102 may include means, such as the communications circuitry 204, the processor 200, and/or the like, for causing transmission of the notification to the additional user. In this regard, the notification may be transmitted to a consumer device 104 via email, for example. Upon receipt, a consumer may accept the invitation, register for the gift giving program and indicate they wish to join a particular gift giving group (such as one associated with the invitation). The group management circuitry 106 may assign the new consumer to the group accordingly.

Figure 10:
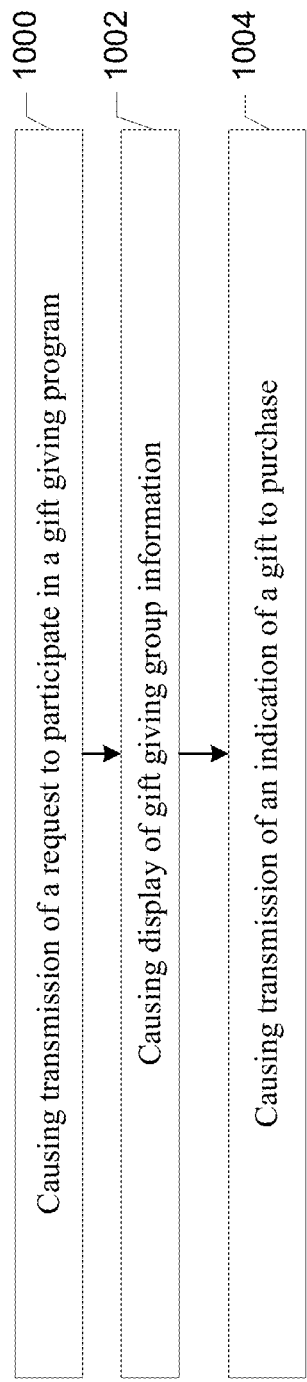

FIG. 10 is a flowchart depicting a process for participating in a group gift giving in accordance with some example embodiments. In some examples, the operations of FIG. 10 may be performed by a consumer device 104 and may include communication between the consumer device 104 and promotion and marketing service 102. In this regard, a consumer may access the promotion and marketing service by a user interface provided by the promotion and marketing service 102 to the consumer device 104, to create a gift giving group, manage a gift giving group, and/or to purchase and receive gifts.

As shown by operation 1000, the consumer device 104 may include means, such as the processor 200, input/output circuitry 206, the communications circuitry 204, and/or the like for causing transmission of a request associated with a first user account to participate in the gift giving program. For example, group management circuitry 106 may provide an interface for display on consumer device 104, which may be used by a consumer to indicate they wish to participate in the gift giving program. The indication may then be transmitted to the promotion and marketing service 102.

As shown by operation 1002, the consumer device 104 may include means, such as the processor 200, the input/output circuitry 206, the communications circuitry 204, and/or the like for causing display of gift giving group information. For example, the group management circuitry 106 may provide information to the consumer device 104 for display, so that the consumer may access information regarding the gift giving group, such as any assigned relationships within the group, the particular consumer's assigned recipient, the particular consumer's assigned gift giver, gift-giving day, price range, and/or the like.

As shown by operation 1004, the consumer device 104 may include means, such as the input/output circuitry 206, the communications circuitry 204, and/or the like for causing transmission of an indication of a gift to purchase for at least a second user account associated with the gift giving group. As described above, the group management circuitry 106 and/or the relevancy circuitry 114 may suggest a gift(s) identified as relevant for a recipient. Additionally or alternatively, a user of the consumer device 104 may browse available gifts and choose a gift to purchase. Regardless of the method, the consumer device 104 may receive an indication from the consumer of the gift to purchase for the recipient, and the indication may be transmitted to the promotion and marketing service 102.

The above described embodiments may promote the purchasing of gifts and may therefore benefit both the promotion and marketing service 102 and provider associated with the gift. Consumers may benefit from embodiments by utilizing a streamlined interface providing for gift exchange group assignments, relationships assignments (e.g., gift giver and recipient), purchasing of a gift, and delivery of the gift to an intended recipient.

As such, the method, apparatus and computer program product provide numerous technical advantages including the conservation of processing resources and the associated power consumption otherwise expended to analyze extensive volumes of data to generate prospective consumers. Embodiments provided herein allow consumers to initiate a group gift exchange, thereby providing additional prospects for sales to the promotion and marketing system. Providing recommendations to consumers based on the relevancy of gifts may decrease the searching and research otherwise performed by a user on a promotion and marketing system while searching for an appropriate gift, thereby conserving the processing resources and power consumption expended on such tasks.

As described above and as will be appreciated based on this disclosure, embodiments of the present invention may be configured as methods, mobile devices, backend network devices, and/or the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising at least one processor and at least one memory including computer program code, the at least one memory and the computer program code configured to, with the processor, cause the apparatus to at least:
receive a group giving request indication that is associated with a first user account associated with a consumer device;
identify one or more second user accounts for extending an invitation to join a gift giving group associated with a gift giving group identifier and the first user account;
transmit notifications to the one or more second user accounts extending an invitation to join the gift giving group;
prohibit assignment of each second user account to the gift giving group until payment information associated with a respective at least one of the second user accounts is submitted, received, and validated, thereby prohibiting generation of a giver/recipient correlation between each respective second user account and any members of the gift giving group until the payment information associated with the respective second user account is validated;
receive a confirmation, via an e-commerce interface, of validation of the payment information received from at least one of the second user accounts;
in response to receiving the confirmation of the validation of the payment information associated with the at least one second user account, correlate the at least one second user account to the gift giving group identifier;
determine a giver/recipient correlation between the first user account and the at least one second user account;
associate a giver identifier with the first user account based on the giver/recipient correlation;
associate a recipient identifier with the at least one second user account based on the giver/recipient correlation, wherein the first user account and the giver identifier are anonymous to the second user account, and the second user account and the recipient identifier are anonymous to the first user account;
store the payment information associated with the at least one second user account and a gift giving deadline associated with the gift giving group;
access gift recipient consumer data associated with the at least one second user account, the gift recipient consumer data comprising at least one of recipient location, recipient interest, or past recipient purchases; and
in response to determining, following expiration of the group gift giving deadline, that a gift has not been purchased for a recipient in the gift giving group, initiate a purchase of a gift identified based on the recipient consumer data, from a respective giver for the respective recipient.

2. The apparatus of claim 1, wherein the one of the one or more second user accounts is selected from the one or more second user accounts at random.

3. The apparatus of claim 1, wherein the gift is a gift voucher redeemable toward a purchase of any of a good or service.

4. The apparatus of claim 1, wherein the gift is identified by determining relevancy scores of respective gifts of a plurality of gifts based on the recipient consumer data.

5. The apparatus of claim 4, wherein the relevancy scores are determined based on at least a target price or price range associated with the gift giving group.

6. The apparatus of claim 4, wherein the relevancy scores of the respective gifts are determined based on at least a location of the gift recipient and respective locations associated with the respective gifts.

7. A method comprising: receiving a group giving request indication that is associated with a first user account associated with a consumer device;
identifying one or more second user accounts for extending an invitation to join a gift giving group associated with a gift giving group identifier and the first user account;
transmitting notifications to the one or more second user accounts extending an invitation to join the gift giving group;
prohibiting assignment of each second user account to the gift giving group until payment information associated with a respective at least one of the second user accounts is submitted, received, and validated, thereby prohibiting generation of a giver/recipient correlation between each respective second user account and any members of the gift giving group until the payment information associated with the respective second user account is validated;
receiving a confirmation, via an e-commerce interface, of validation of the payment information received from at least one of the second user accounts;
in response to receiving the confirmation of the validation of the payment information associated with the at least one second user account, correlating the at least one second user account to the gift giving group identifier;
determining a giver/recipient correlation between the first user account and the at least one second user account;
associating a giver identifier with the first user account based on the giver/recipient correlation;
associating a recipient identifier with the at least one second user account based on the giver/recipient correlation, wherein the first user account and the giver identifier are anonymous to the second user account, and the second user account and the recipient identifier are anonymous to the first user account;
storing the payment information associated with the at least one second user account and a gift giving deadline associated with the gift giving group; accessing gift recipient consumer data associated with the at least one second user account, the gift recipient consumer data comprising at least one of recipient location, recipient interest, or past recipient purchases; and
in response to determining, following expiration of the group gift giving deadline, that a gift has not been purchased for a recipient in the gift giving group, initiate a purchase of a gift identified based on the recipient consumer data, from a respective giver for the respective recipient.

8. The method of claim 7, wherein the one of the one or more second user accounts is selected from the one or more second user accounts at random.

9. The method of claim 7, wherein the gift is a gift voucher redeemable toward a purchase of any of a good or service.

10. The method of claim 7, wherein the gift is identified by determining relevancy scores of respective gifts of a plurality of gifts based on the recipient consumer data.

11. The method of claim 10, wherein the relevancy scores are determined based on at least a target price or price range associated with the gift giving group.

12. The method of claim 10, wherein the relevancy scores of the respective gifts are determined based on at least a location of the gift recipient and respective locations associated with the respective gifts.

13. A non-transitory computer-readable storage medium having computer-executable program code instructions stored therein, the computer-executable program code instructions comprising program code instructions to:
receive a group giving request indication that is associated with a first user account associated with a consumer device;
identify one or more second user accounts for extending an invitation to join a gift giving group associated with a gift giving group identifier and the first user account;
transmit notifications to the one or more second user accounts extending an invitation to join the gift giving group;
prohibit assignment of each second user account to the gift giving group until payment information associated with a respective at least one of the second user accounts is submitted, received, and validated, thereby prohibiting generation of a giver/recipient correlation between each respective second user account and any members of the gift giving group until the payment information associated with the respective second user account is validated;
receive a confirmation, via an e-commerce interface, of validation of the payment information received from at least one of the second user accounts;
in response to receiving the confirmation of the validation of the payment information associated with the at least one second user account, correlate the at least one second user account to the gift giving group identifier;
determine a giver/recipient correlation between the first user account and the at least one second user account;
associate a giver identifier with the first user account based on the giver/recipient correlation; associate a recipient identifier with the at least one second user account based on the giver/recipient correlation, wherein the first user account and the giver identifier are anonymous to the second user account, and the second user account and the recipient identifier are anonymous to the first user account;
store the payment information associated with the at least one second user account and a gift giving deadline associated with the gift giving group; access gift recipient consumer data associated with the at least one second user account, the gift recipient consumer data comprising at least one of recipient location, recipient interest, or past recipient purchases; and
in response to determining, following expiration of the group gift giving deadline, that a gift has not been purchased for a recipient in the gift giving group, initiate a purchase of a gift identified based on the recipient consumer data, from a respective giver for the respective recipient.

14. A non-transitory computer-readable storage medium of claim 13, wherein the one of the one or more second user accounts is selected from the one or more second user accounts at random.

15. A non-transitory computer-readable storage medium of claim 13, wherein the gift is a gift voucher redeemable toward a purchase of any of a good or service.

16. A non-transitory computer-readable storage medium of claim 13, wherein the gift is identified by determining relevancy scores of respective gifts of a plurality of gifts based on the recipient consumer data.

17. A non-transitory computer-readable storage medium of claim 16, wherein the relevancy scores are determined based on at least a target price or price range associated with the gift giving group.

18. A non-transitory computer-readable storage medium of claim 16, wherein the relevancy scores of the respective gifts are determined based on at least a location of the gift recipient and respective locations associated with the respective gifts.

* * * * *